United States Patent
Rose et al.

(10) Patent No.: US 10,183,645 B2
(45) Date of Patent: Jan. 22, 2019

(54) FRONTAL AIRBAG SYSTEMS FOR OBLIQUE IMPACT

(71) Applicant: Autoliv ASP, Inc., Ogden, UT (US)

(72) Inventors: Larry D. Rose, South Weber, UT (US); Eric M. Heitkamp, Dublin, OH (US)

(73) Assignees: Autoliv ASP, Inc., Ogden, UT (US); Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 15/446,904

(22) Filed: Mar. 1, 2017

(65) Prior Publication Data
US 2018/0251093 A1    Sep. 6, 2018

(51) Int. Cl.
*B60R 21/205* (2011.01)
*B60R 21/261* (2011.01)
*B60R 21/233* (2006.01)
*B60R 21/26* (2011.01)
*B60R 21/00* (2006.01)
*B60R 21/01* (2006.01)

(52) U.S. Cl.
CPC .......... *B60R 21/205* (2013.01); *B60R 21/233* (2013.01); *B60R 21/261* (2013.01); *B60R 2021/0004* (2013.01); *B60R 2021/0009* (2013.01); *B60R 2021/01013* (2013.01); *B60R 2021/23308* (2013.01); *B60R 2021/26094* (2013.01)

(58) Field of Classification Search
CPC ... B60R 21/205; B60R 21/233; B60R 21/261; B60R 2021/23308; B60R 2021/01013; B60R 2021/0009; B60R 2021/26094; B60R 2021/0004
See application file for complete search history.

(56) References Cited

U.S. PATENT DOCUMENTS

| | | | | |
|---|---|---|---|---|
| 4,262,931 | A * | 4/1981 | Strasser | B60R 21/233 280/729 |
| 2004/0051285 | A1* | 3/2004 | Fischer | B60R 21/233 280/739 |
| 2009/0146403 | A1* | 6/2009 | Fukawatase | B60R 21/233 280/732 |
| 2014/0375032 | A1* | 12/2014 | Fukawatase | B60R 21/239 280/729 |
| 2015/0166002 | A1* | 6/2015 | Fukawatase | B60R 21/233 280/730.1 |
| 2015/0307055 | A1* | 10/2015 | Cheng | B60R 21/203 280/728.3 |

(Continued)

FOREIGN PATENT DOCUMENTS

JP    5366591 B2    12/2013

*Primary Examiner* — Darlene P Condra
(74) *Attorney, Agent, or Firm* — Stoel Rives LLP

(57) ABSTRACT

An inflatable airbag system can be configured to be mounted at a frontal region of a vehicle. The inflatable airbag system includes an airbag comprising a center cushion and a pair of side cushions each coupled to the center cushion on opposing sides of the center cushion. The side cushions can each have a triangular shape with an apex extending rearward further than at least a portion of an occupant-facing surface of the center cushion. The side cushions can be oriented with respect to each other at opposing angles relative to the center cushion such that an overall geometrical shape of the airbag is wider at a forward reaction base area of the airbag than at a rearward occupant-receiving area.

25 Claims, 11 Drawing Sheets

(56) References Cited

U.S. PATENT DOCUMENTS

| | | | | |
|---|---|---|---|---|
| 2015/0321636 A1* | 11/2015 | Jang | ...................... | B60R 21/233 |
| | | | | 280/743.2 |
| 2015/0343986 A1* | 12/2015 | Schneider | .............. | B60R 21/205 |
| | | | | 280/729 |
| 2015/0367802 A1* | 12/2015 | Fukawatase | .......... | B60R 21/205 |
| | | | | 280/732 |
| 2016/0046257 A1* | 2/2016 | Yamada | .............. | B60R 21/2338 |
| | | | | 280/729 |
| 2017/0015266 A1* | 1/2017 | El-Jawahri | ........ | B60R 21/01512 |
| 2017/0036639 A1 | 2/2017 | Yamada | | |
| 2017/0057453 A1* | 3/2017 | Morris | .................. | B60R 21/233 |

* cited by examiner

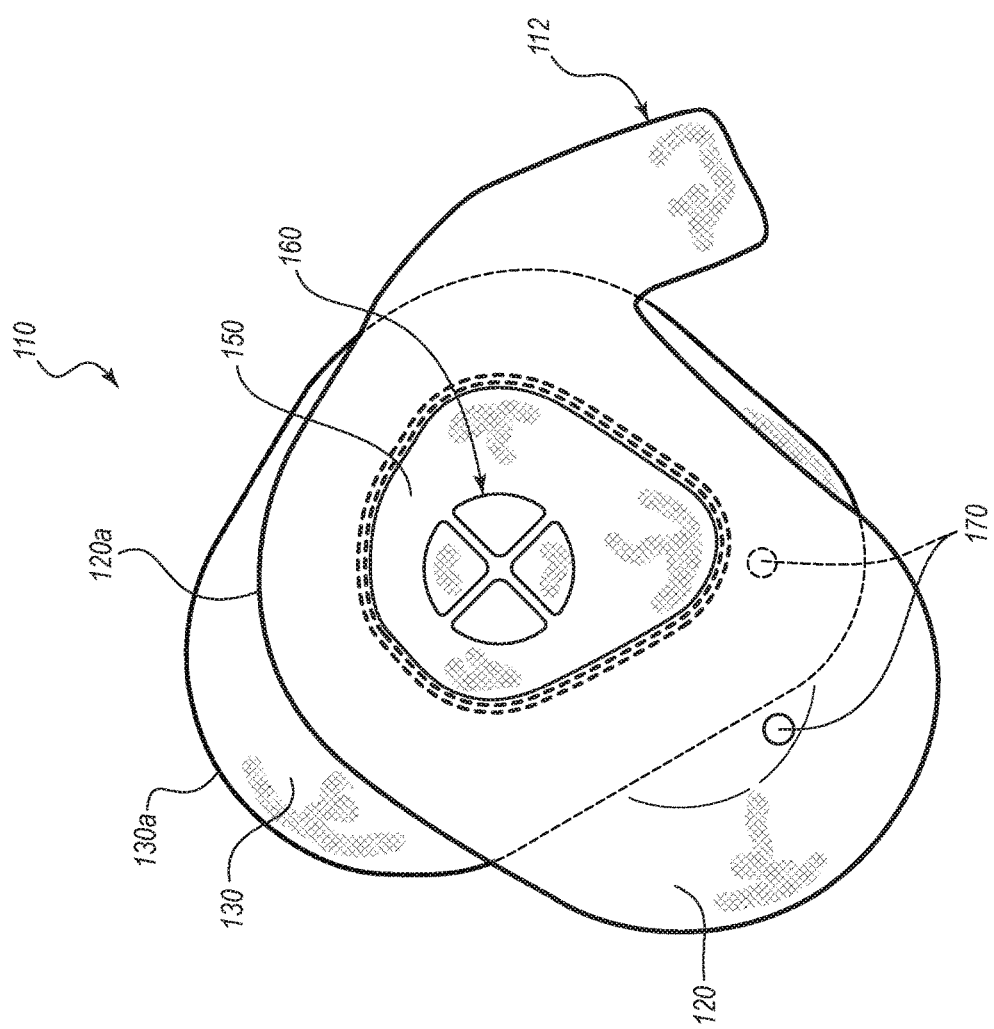

FRONTAL AIRBAG SYSTEMS FOR OBLIQUE IMPACT

TECHNICAL FIELD

The present disclosure relates generally to the field of automotive protective systems. More specifically, the present disclosure relates to frontal airbag systems that are configured to deploy in response to frontal and oblique collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 5 is a side sectional view of the airbag cushion of FIG. 4.

DETAILED DESCRIPTION

Figure 1:
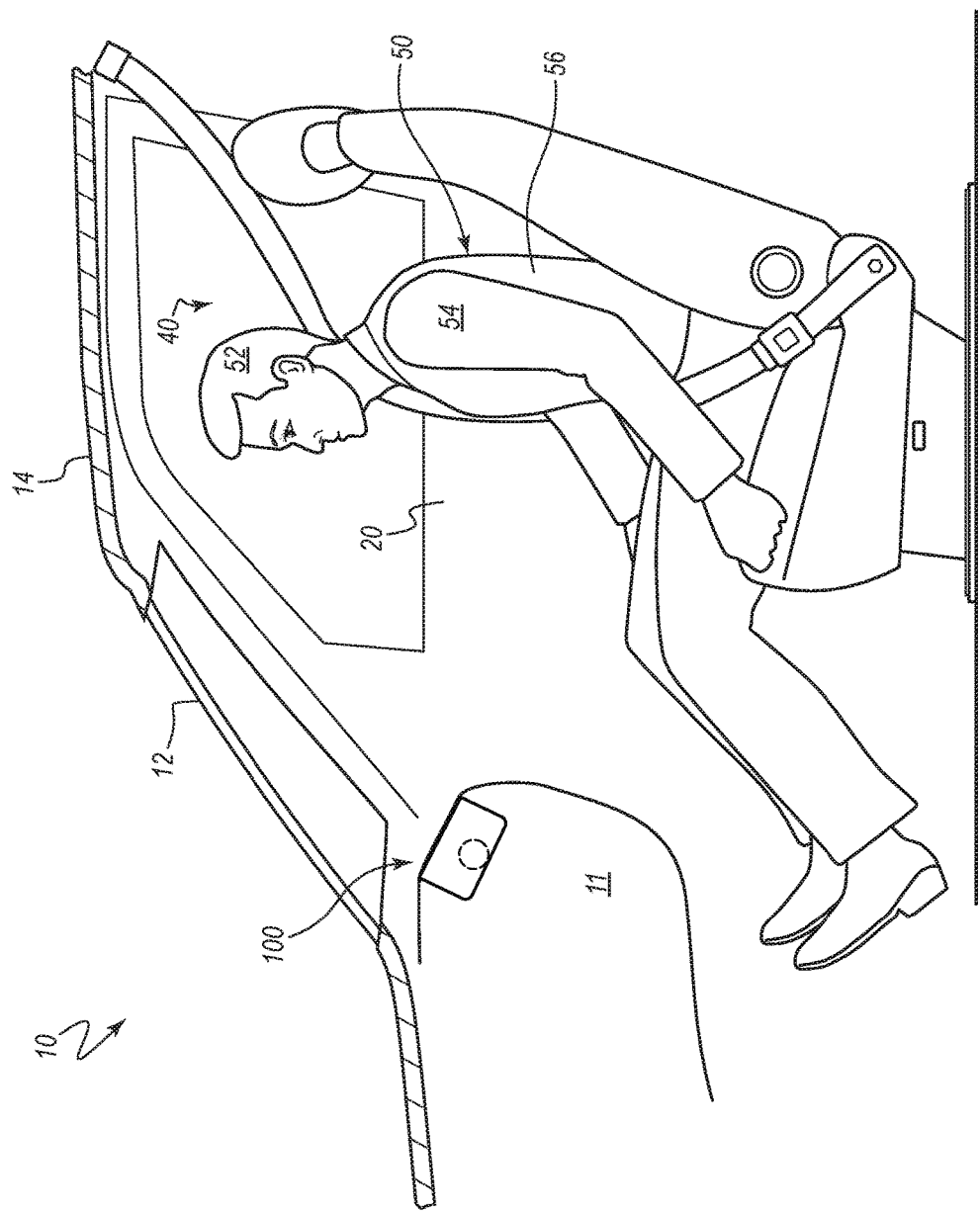
FIG. 1 is a side view of an interior of a vehicle having an inflatable airbag system, according to one embodiment of the present disclosure, depicted in a compact pre-deployment configuration.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other.

As used herein, "inboard" refers to a direction toward a centerline of a vehicle and "outboard" refers to a direction out of the vehicle and away from a centerline of the vehicle.

The phrases "attached to" or "attached directly to" refer to interaction between two or more entities which are in direct contact with each other and/or are separated from each other only by a fastener of any suitable variety (e.g., mounting hardware or an adhesive).

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

The term "occupant" refers to a person or crash test dummy within a vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as horizontal, are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within the dashboard, although the principles discussed may apply to other types of airbags (e.g., driver airbags housed within the steering wheel, knee airbags, and side airbags).

Front airbags are often installed in a steering wheel, dashboard, or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

During installation, the disclosed airbags are typically disposed at an interior of a housing in a packaged state (e.g., are rolled, folded, and/or otherwise compressed) or a compact configuration, and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for cushioning a front-seat passenger, and may be mounted in a dashboard. An airbag assembly can mitigate injury to an occupant of a vehicle during a collision event by reducing the effect of impact of the occupant against structures (body-structure impact) within the vehicle (such as, e.g., a dashboard or door column). While airbag assemblies are useful in mitigating such injuries, occupant impact on an airbag assembly introduces a risk for other injuries. For example, prior to a collision event, an occupant's head is in motion more or less synchronously with the vehicle. During the collision event, the vehicle's direction of travel and speed may be altered severely and abruptly. When such a collision triggers the deployment of an airbag cushion from an airbag assembly, the airbag cushion accelerates in a direction specifically relative to the vehicle. That is, a frontal airbag will deploy nominally rearward from the dashboard.

Some embodiments disclosed herein can provide improved positioning, cushioning, and/or safety to occupants involved in particular types of collisions. For example, some embodiments can be particularly suited to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol (Version II )* (Dec. 2012) and Saunders, J., Craig, M., and Parent, D., *Moving Deformable Barrier Test Procedure for Evaluating Small Overlap/Oblique Crashes*, SAE Int. J. Commer. Veh. 5(1): 172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

FIG. 1 is a side view of an interior of a vehicle 10 having an inflatable airbag system 100 depicted in a compact configuration, according to one embodiment of the present disclosure. The airbag system 100 is configured to be mounted at a frontal region of a vehicle 10. The airbag system 100 is shown installed in a vehicle 10. The vehicle 10 is equipped with a dashboard (also known as an instrument panel) 11, a windscreen 12, a roof 14, and a side door 20. The vehicle 10 may provide a vehicle seating position 40. The vehicle seating position 40 is a position within the vehicle 10 to accommodate an occupant 50 in a seated, forward-facing position, and may include appropriate accoutrement (e.g., seat, seat back, cushion(s), pad(s), headrest, harness, etc.). In FIG. 1, an occupant 50 is seated in the vehicle seating position 40 facing forward in the vehicle 10, and the airbag system 100 is mounted to the dashboard 11. A torso 56, shoulders 54 and a head 52 of the occupant 50 are in an upright position.

Figure 2:
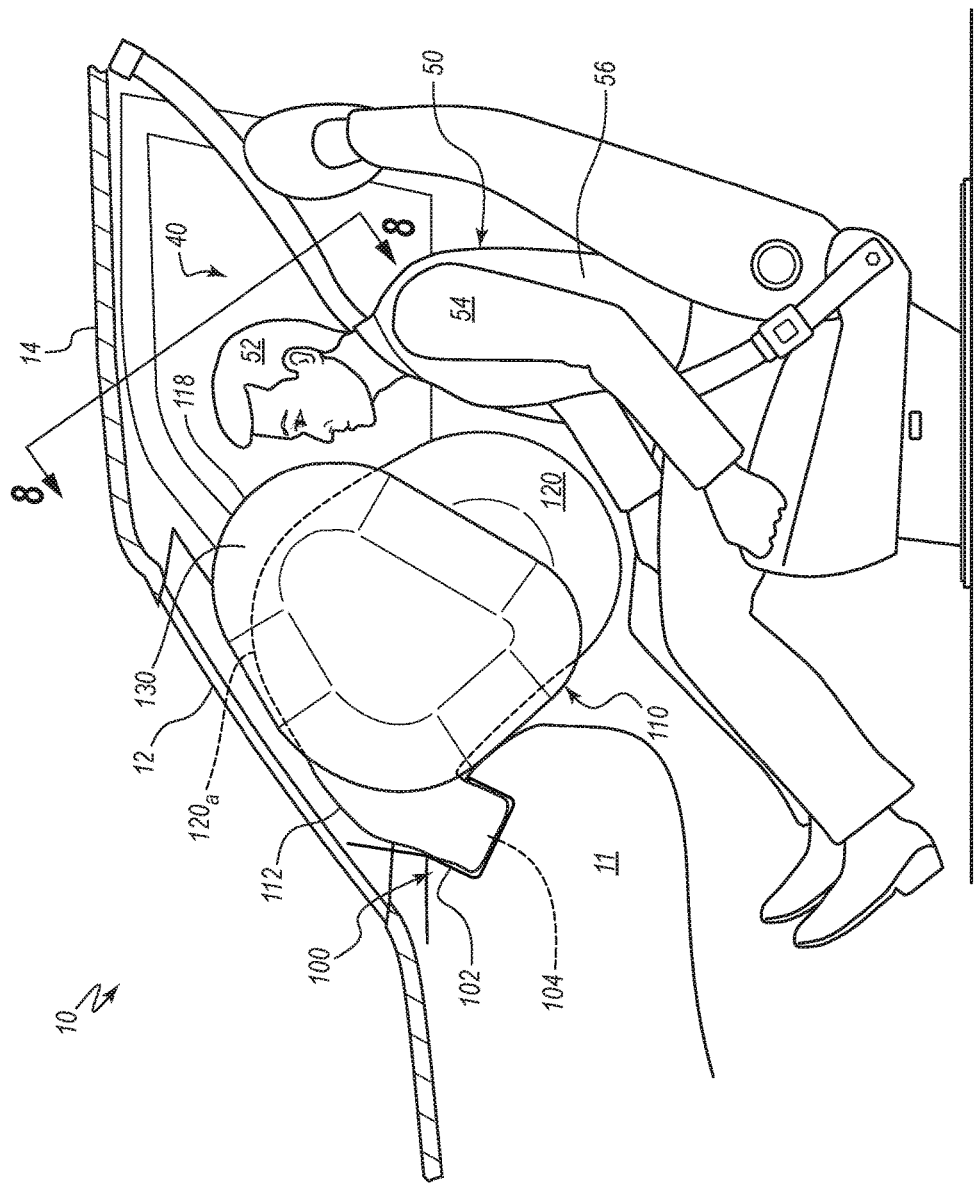
FIG. 2 is another side view of the interior of the vehicle having the inflatable airbag system of FIG. 1, depicted with the inflatable airbag system deployed.

FIG. 2 is another side view of the interior of the vehicle 10 having the inflatable airbag system 100 of FIG. 1. In FIG. 2, the inflatable airbag system 100 is shown deployed. The occupant 50 has not impacted the airbag cushion 110. The airbag system 100 may include a housing 102, an inflator 104, and an airbag cushion 110 (also known as an airbag or a gas bag). In the embodiment shown, the housing 102 is configured to be mounted to the dashboard 11 of the vehicle 10. The inflator 104 may comprise one or more inflation mechanisms and channels and/or conduits to guide, direct, and/or transport inflation gases from the inflator 104 to a inflation duct 112 of the airbag cushion 110. The inflator 104 may be at least partially disposed within the housing 102. The airbag cushion 110 may be configured to receive inflation gases from the inflator 104 to expand and deploy the airbag cushion 110 from a packaged condition within the housing 102 to a deployed configuration. One or more forward and/or upward portions of the deployed airbag cushion 110 may rest against the windscreen 12, the dashboard 11, or both. The airbag cushion 110 includes a center cushion 120 and a pair of side cushions 130, 140 (side cushion 140 is not visible in FIG. 2, but see, e.g., FIG. 3A). The airbag cushion 110 may include an occupant facing surface 118. The occupant facing surface 118 may include the rearward surfaces of the two side cushions 130, 140 and the rearward surface of the center cushion 120. The center cushion 120 and the side cushions 130, 140 are inflatable chambers. The center cushion 120 may have a longitudinal profile (profile along a longitudinal axis of the vehicle 10, such as may be viewed from a side of the vehicle 10) generally of an angled (e.g., tipped forward relative to the vehicle 10) and elongated oval or rectangle with rounded corners. The rear surface of the center cushion 120 slopes downward and rearward from its apex 120a toward the torso 56 of the occupant 50. The center cushion 120 may interact with the torso 56 of the occupant 50 during a collision event. Each side cushion 130, 140 may have a generally triangular longitudinal profile with the apex of the triangle pointing rearward above the shoulders 54 of the occupant 50. The rearward apex of each side cushion 130, 140 may extend further to the rear than a portion (e.g., an upper portion) of the rear surface of the center cushion 120. More particularly, the side cushions 130, 140 may be disposed such that they interact only with the head 52 of the occupant 50, particularly at initial impact of the occupant 50 with the airbag cushion 110, as is further described below. When deployed, the airbag system 100 and, in particular, the airbag cushion 110 may provide crash (injury) protection to an occupant 50 during a collision event. One or more sensors, including collision sensor(s), may trigger deployment of the airbag system 100.

In other embodiments, the longitudinal profile of the side cushions 130, 140 may be other than triangular shaped, such as rectangular, oblong, circular, or any other suitable shape to extend rearward further than a portion (e.g., an upper portion) of the rear surface of the center cushion 120.

Figure 3A:
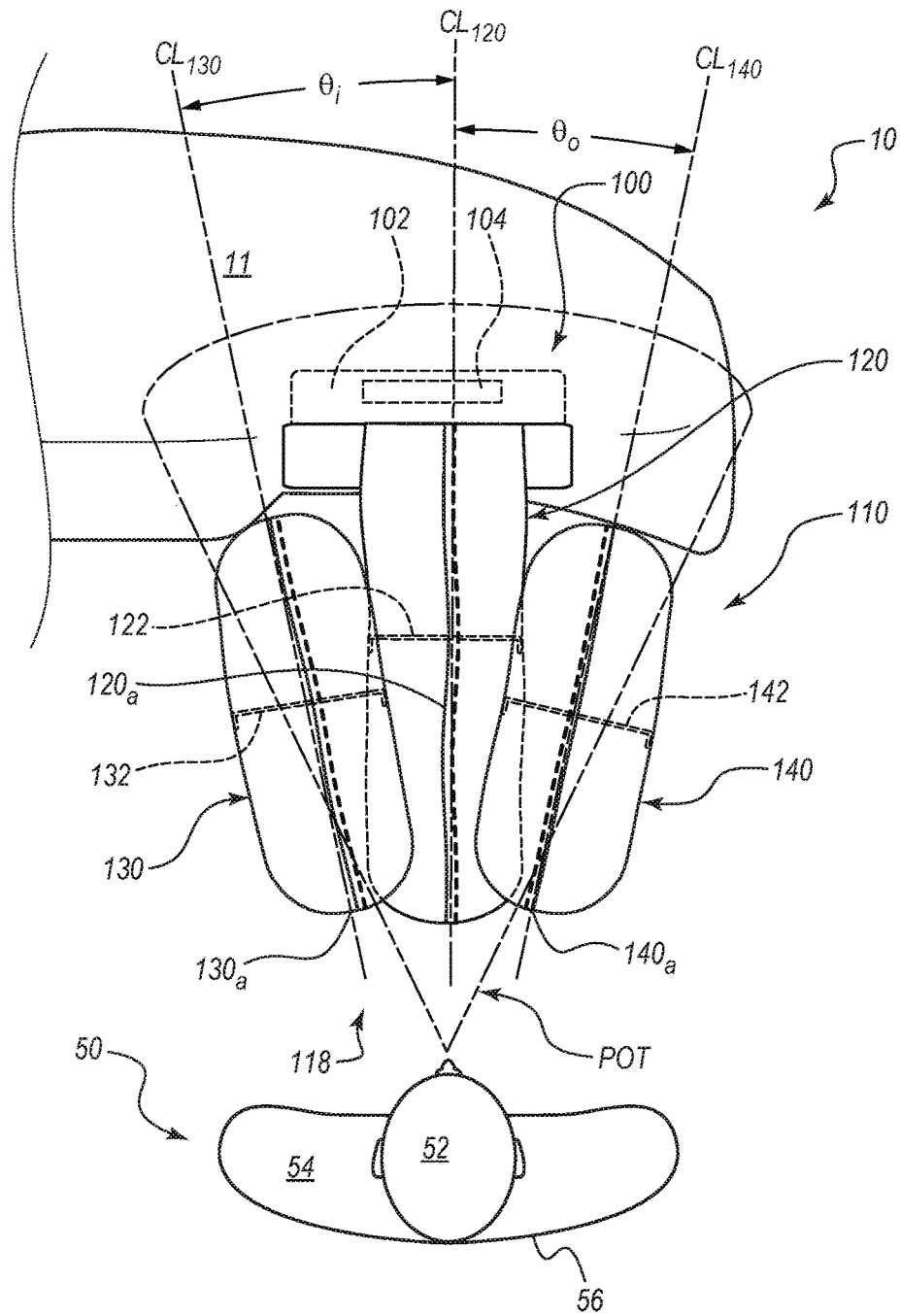
FIG. 3A is a top view of the inflatable airbag system of FIG. 1, with the airbag system deployed.

FIG. 3A is a top view of the inflatable airbag system 100 of FIG. 1, with the airbag system 100 in a deployed state. In the embodiment shown in FIG. 3A, the housing 102 of the airbag system 100 is mounted to the dashboard 11 of the vehicle 10. The airbag cushion 110 has been deployed by operation of the inflator 104. The head 52, shoulders 54 and torso 56 of the occupant 50 have not contacted the airbag cushion 110. The airbag cushion 110 may include a center cushion (or center inflatable chamber) 120 and a pair of side cushions 130, 140.

The center cushion 120 may be disposed forward of the vehicle seating position (not shown, but see, e.g., FIGS. 1 and 2), or, in other words, forward of a nominal position of an occupant 50 seated in the vehicle 10. A rearward surface of the center cushion 120 slopes downward from the apex 120a of the center cushion 120.

The two side cushions 130, 140 may be coupled to the center cushion 120 and positioned on opposing lateral sides of the center cushion 120. The two side cushions 130, 140 may be oriented at opposite angles longitudinally such that the forward portions of the side cushions 130, 140 are positioned and spaced wider apart than are the rearward portions of the side cushions 130, 140. For example, a longitudinal centerline $CL_{130}$, $CL_{140}$ of each side cushion 130, 140 may be oriented at an angle $\theta_i$, $\theta_o$ relative to a longitudinal centerline $CL_{120}$ of the center cushion 120, such that the longitudinal centerlines $CL_{130}$, $CL_{140}$ of the side cushions 130, 140 are transverse to each other and to the longitudinal centerline $CL_{120}$ of the center cushion 120. While the airbag cushion 110 may have an overall asymmetric profile, the opposite angles $\theta_i$, $\theta_o$ of the two side cushions 130, 140 may give the airbag cushion 110 a symmetric geometric shape from a perspective of the occupant 50, such that the occupant facing surface 118 (see FIG. 2) is symmetric from the perspective of the occupant 50 seated in the vehicle seating position 40 (see FIG. 1).

The specific configurations of the two side cushions 130, 140 may differ from each other. The lateral location of the inboard side cushion 130 may align with an area of the dashboard 11, the windscreen (not shown, but see, e.g., 12 in FIG. 3B), and, in some vehicles, the roof (not shown) which differ from the corresponding areas aligning with the lateral location of the outboard side cushion 140. In other words, at the location of the inboard side cushion 130, there may be more volume between the occupant 50 and the dashboard 11 and windscreen and, in some vehicles, the roof than there is at the location of the outboard side cushion 140. Each side cushion 130, 140 may be specifically configured so that it deploys and inflates to equally rest against the relevant surfaces of the dashboard 11 and windscreen and, in some vehicles, the roof and present a symmetric receiving area to engage the occupant 50 during a collision event. For example, in some embodiments, the inboard side cushion 130 may have a different angle relative to vehicle-horizontal than the outboard side cushion 140 (see, e.g., FIG. 4). In some embodiments, one side cushion 130, 140 may be longitudinally longer than the other. In some embodiments, the two side cushions 130, 140 may vary in the generally triangular form when viewed from a side. These variations may be tailored to conform to the interior structures of a specific vehicle so that the deployed and inflated airbag cushion 110 presents generally a symmetric occupant-facing surface 118 to receive the occupant 50 during a collision event.

The inboard side cushion 130 may be configured with a specific volume and size which differs from that of the outboard side cushion 140. The inboard side cushion 130 may be configured to fill the generally larger space of a vehicle between the dashboard 11, windscreen (not depicted) and occupant 50. The outboard side cushion 140 may be configured to fill the generally smaller space of a vehicle between the dashboard 11, windscreen and occupant 50. The overall geometric shape of the airbag cushion 110 may provide a wider forward reaction base area where the airbag cushion 110 may engage with the vehicle 10 at the dashboard 11 and/or windscreen. As noted in FIG. 2, the deployed airbag cushion 110 may also couple to the windscreen and/or roof. This coupling of the deployed airbag cushion 110 to the dashboard 11, windscreen and/or roof may provide support to stabilize the airbag cushion 110 throughout a collision event. A region of possible occupant trajectory (POT) in an oblique collision is illustrated. The center cushion 120 may be oriented to receive the torso 56 of the occupant 50 during a collision event. The two side cushions 130, 140 may be oriented to receive the head 52 of the occupant 50 during a collision event. The rear surfaces of the side cushions 130, 140 may provide support to the head 52 of the occupant 50 to limit, reduce, or eliminate rotation of the head 52 resulting from the angular forces generated in an oblique collision.

The airbag cushion 110 may include at least one internal lateral tether 122. In the embodiment shown, each cushion 120, 130, 140 includes an interior lateral tether 122, 132, 142. The internal lateral tether 122 may limit lateral expansion of the center cushion 120. The internal lateral tether 122 may position the two side cushions 130, 140 by configuring the center cushion 120 during inflation. The internal lateral tether 122 may configure the center cushion 120 to support the torso 56 of the occupant 50 by limiting lateral deformation of the central cushion 120 during ridedown. The internal lateral tether 132 may assist in limiting lateral expansion of the inboard side cushion 130. The internal lateral tether 132 may assist in supporting the head 52 of the occupant 50 by limiting lateral deformation of the inboard side cushion 130 during ridedown. The internal lateral tether 142 may limit lateral expansion of the outboard side cushion 140. The internal lateral tether 142 may assist in supporting the head 52 of the occupant 50 by limiting lateral deformation of the outboard side cushion 140 during ridedown. The internal lateral tethers 132, 142 may configure the two side cushions 130, 140 to support the head 52 and/or shoulders of the occupant 50, and to limit, reduce, or prevent rotation of the head 52. A configuration of one or more lateral tethers may limit lateral expansion of the airbag cushion 110. The tether can be any combination of quantity, size (width and length) and orientation (horizontal, vertical, angled). Limiting lateral expansion of the airbag cushion 110 may help reduce the total volume of inflation gases required to fully deploy and inflate the airbag cushion 110. Reducing the total volume of inflation gases required to fully deploy and inflate the airbag cushion 110 may allow quicker inflation than in other airbag configurations, or than may be required without the internal lateral tethers. A configuration of one or more internal lateral tethers may assist the airbag cushion 110 in supporting the head 52 and torso 56 of the occupant 50 during ridedown.

While the embodiment shown includes three internal lateral tethers 122, 132, 142, other combinations and configurations of the internal tether system may permit tuning the performance of the airbag cushion 110 to achieve optimal effectiveness in the specific space and arrangement of structures in any given vehicle. For example, a single tether may span two or three chambers laterally.

Figure 3B:
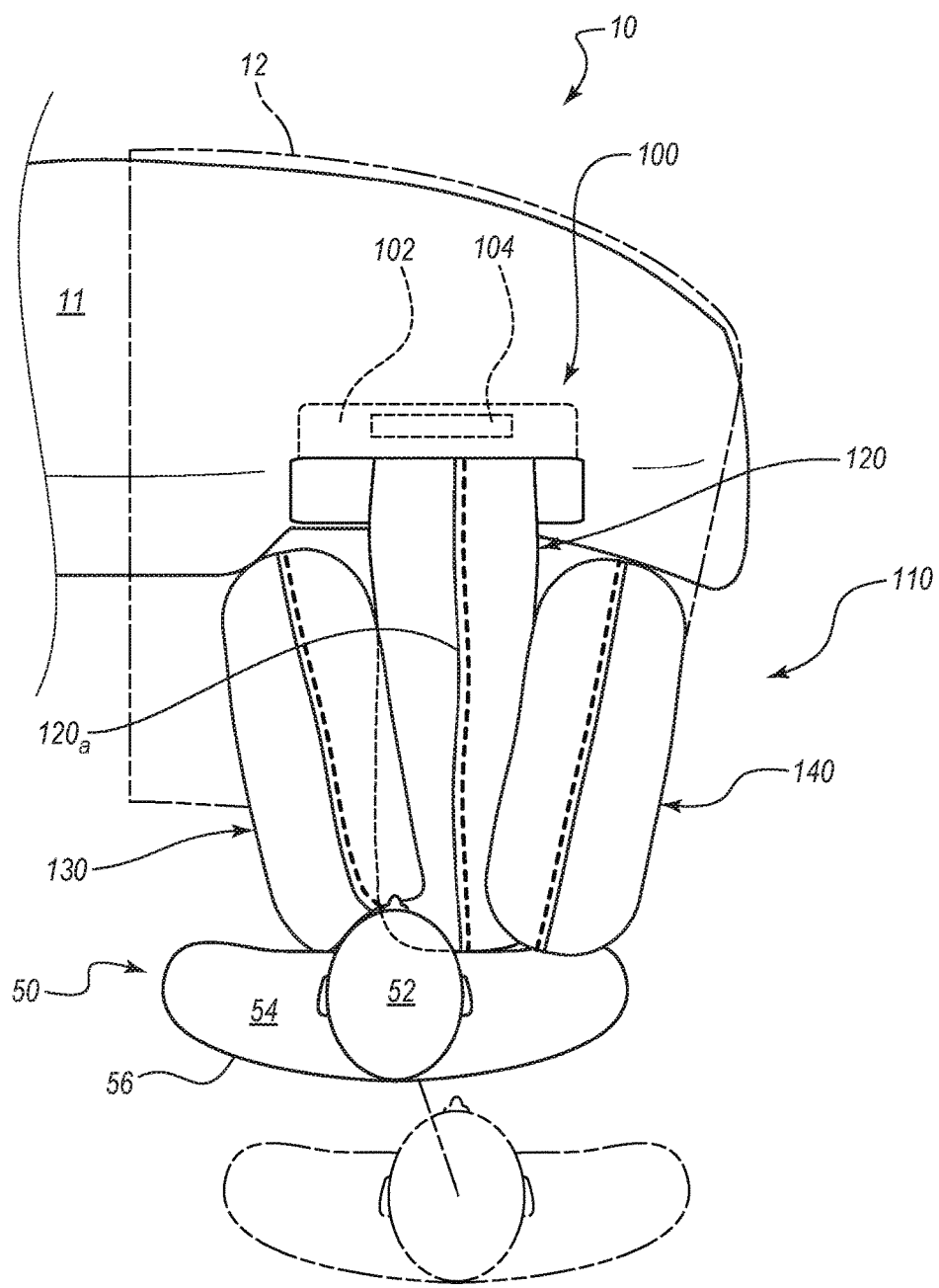
FIG. 3B is a top view of the inflatable airbag system of FIG. 3A, with the airbag system deployed and the occupant in contact with the airbag cushion.

FIG. 3B is a top view of the inflatable airbag system 100 of FIG. 3A when the airbag system 100 is deployed and the occupant 50 is in contact with the airbag cushion 110. FIG. 3B illustrates the occupant 50 in contact with the airbag cushion 110 as a result of an oblique collision. The side cushions 130, 140 may be supported by the dashboard 11, the windscreen 12, and the roof (not depicted). The center cushion 120 may be supported by the dashboard 11. The occupant 50 has moved at an angle forward and inward relative to the vehicle 10. The torso 56 of the occupant 50 is in contact with the center cushion 120. The head 52 of the occupant 50 is in contact with the inboard side cushion 130. As the collision event continues, the head 52 of the occupant 50 may come into contact with the outboard side cushion 140 during ridedown. The center cushion 120 may decelerate (relative to the vehicle 10) the torso 56 of the occupant 50 during ridedown. The engagement of the head 52 of the occupant 50 to one or both of the two side cushions 130, 140 may decelerate the head 52 and may reduce, limit, or prevent rotation of the head 52. Controlling rotation of the head 52 of the occupant 50 may limit, reduce, or prevent certain head and/or neck injuries related to head rotation.

Figure 4:
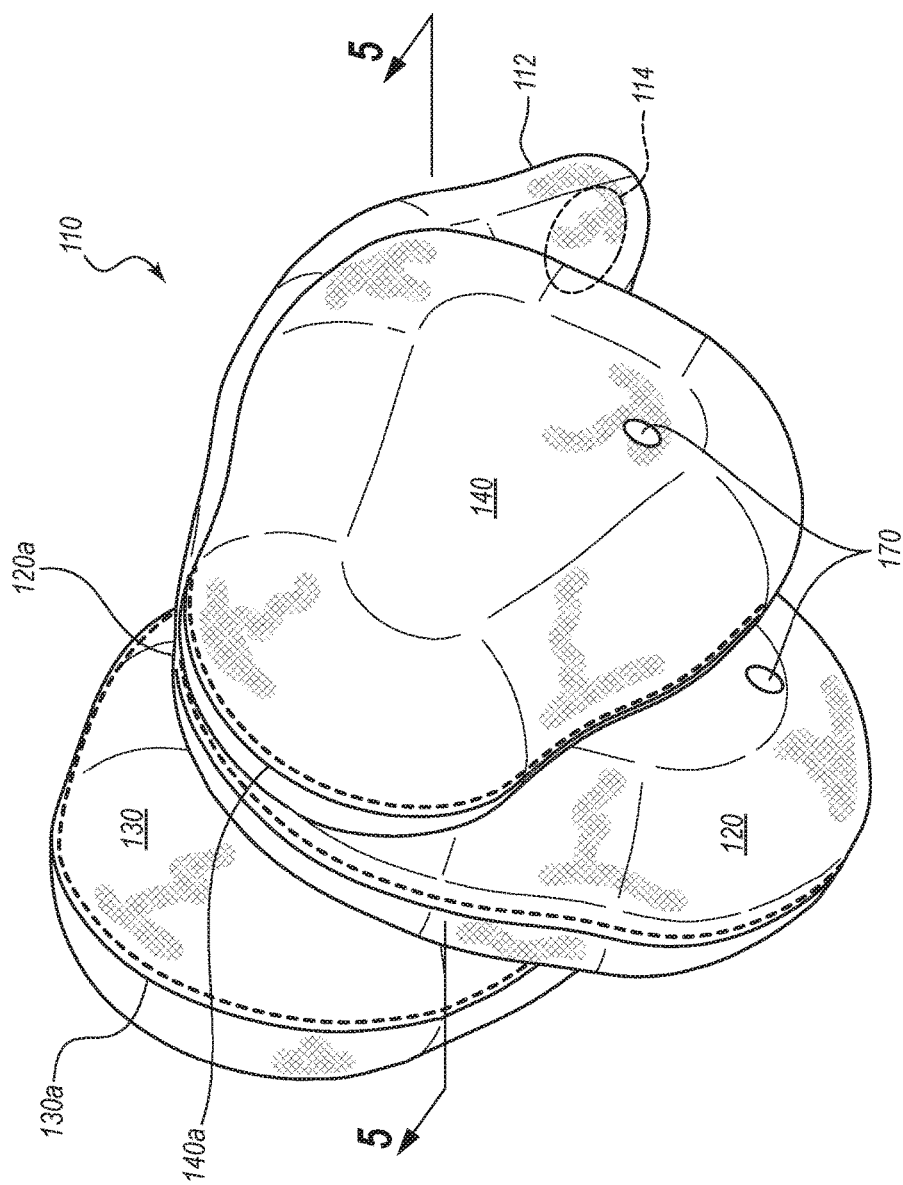
FIG. 4 is a perspective view of the airbag cushion of FIGS. 3A and 3B in a deployed and inflated state.

FIG. 4 is a right perspective view of the airbag cushion 110 of FIGS. 3A and 3B in a deployed and inflated state. The airbag cushion 110 has been deployed and inflated by operation of the inflator (not shown). In some embodiments, the airbag cushion 110 may be constructed from a single panel of fabric and formed by a combination of cuts and seams. In other embodiments, the airbag cushion 110 may be constructed from multiple panels of fabric coupled together at seams. Seams may be formed by sewing, taping, adhesive, radio frequency (RF) welding, or any other appropriate method. The airbag cushion 110 may include a center cushion 120 (also known as a center lobe), an inboard side cushion 130 (also known as an inboard side lobe), an outboard side cushion 140 (also known as an outboard side lobe), and at least one inflation duct 112. The inflation duct 112 may include at least one inflation aperture 114. The inflation aperture(s) 114 may be contiguous with the inflation duct 112, in particular, at the forward end of the inflation duct 112. The inflation aperture(s) 114 may admit inflation gases from the inflator (not shown, but see, e.g., 104 in FIGS. 3A, 3B) to the inflation duct 112. The inflation duct 112 may communicate inflation gases to one or more of the cushions 120, 130, 140. In the embodiment shown in FIG. 4, the airbag cushion 110 may couple to the inflator or inflator plumbing (e.g., channels or conduits to direct inflation gas) at the inflation duct 112. In various embodiments, there may be one or more inflation ducts 112. The inflation duct(s) 112 may be contiguous with the center cushion 120, or with either or both of the side cushions 130, 140, or with all three cushions 120, 130, 140. In some embodiments, a loop diffuser may be included in addition to an inflation duct and/or in place of an inflation duct.

The center cushion 120 may have a rear surface which angles downward and rearward from the apex 120a of the center cushion 120. The two side cushions 130, 140 may be disposed adjacent an upper portion (e.g., an upper half) of the center cushion 120. The inboard side cushion 130 may be coupled to the inboard side of the center cushion 120 such that the inboard side cushion 130 may be positioned adjacent to the inboard side of the center cushion 120 in a deployed and inflated state. The inboard side cushion 130 may be oriented at an angle transverse to the longitudinal axis of the center cushion 120 with the forward aspect of the inboard side cushion 130 generally inboard (relative to the vehicle) of the rear aspect (occupant-facing surface) of the inboard side cushion 130. The outboard side cushion 140 may be coupled to the outboard side of the center cushion 120 such that the outboard side cushion 140 may be positioned adjacent to the outboard side of the center cushion 120 in a deployed and inflated state. The outboard side cushion 140 may be oriented at an angle transverse to the longitudinal axis of the center cushion 120 with the forward aspect of the outboard side cushion 140 generally outboard (relative to the vehicle) of the rear aspect (occupant-facing surface) of the outboard side cushion 140.

Prior to deployment, the airbag cushion 110, including at least the center cushion 120 and the two side cushions 130, 140 may be packaged in a compressed state within the housing (not shown, but see, e.g., FIGS. 1, 2). During the deployment cycle in a collision event, the airbag cushion 110, including at least the center cushion 120 and the two side cushions 130, 140, may deploy from the housing and receive inflation gases to inflate.

The center cushion 120 may have a generally oval shape, or an irregular tetragon shape. The center cushion 120 may have an apex 120a on the upper portion of the center cushion 120 which may be at or near the longitudinal center of the center cushion 120. The center cushion 120 may have a rearward slope of the upper surface of the center cushion 120 from the apex 120a.

The center cushion 120 may include at least one vent 170. In at least one embodiment, the vent(s) 170 may function passively to permit inflation gases to escape from the center cushion 120 at a limited rate once a preconfigured pressure is attained in the center cushion 120. When inflation gases are permitted to escape from the center cushion 120 at a limited rate, inflation gases may continue to flow into the center cushion 120 and pass through valves (not shown) to the side cushions 130, 140 (further described, below). In other embodiments, the vent(s) 170 may be activated at a preconfigured time after the initiation of deployment to permit inflation gases to escape from the center cushion 120 at a limited rate. Time-delaying the activation of the vent(s) 170 may permit inflation gases to flow into the center cushion 120 and to pass through valves (not shown) to the side cushions 130, 140 until a specified pressure is attained in the side cushions 130, 140 before venting inflation gases from the center cushion 120 to establish a lower pressure in the center cushion 120 than in the side cushions 130, 140. In other embodiments, a higher pressure in the side chambers is achieved through use of a check valve system along with venting in the center chamber that is greater than any venting in either of the side chambers. The vent(s) 170 may allow a degree of control to the rate of deflation of the center cushion 120 during ridedown.

The two side cushions 130, 140 each have a generally triangular profile, including an apex 130a, 140a that is oriented rearward relative to the vehicle. The apices 130a, 140a extend substantially rearward relative to the apex 120a and sloping rear surface of the center cushion 120. The apices 130a, 140a may be disposed above the shoulders so as to receive the head of an occupant, particularly at initial impact of the occupant with the airbag cushion 110 during an oblique collision event. The size and shape of the inboard side cushion 130 differ from the size and shape of the outboard side cushion 140. In the embodiment shown, the inboard side cushion 130 is somewhat larger and angled differently than the outboard side cushion 140. The configuration (size, shape and angle) of the inboard side cushion 130 generally conforms to the space available in a particular vehicle between the dashboard, windscreen and roof (not depicted), which is typically larger toward the inboard region than toward the outboard region. The configuration (size, shape and angle) of the outboard side cushion 140 generally conforms to the space available in a particular vehicle between the dashboard, windscreen, roof, and door (not depicted), which is typically smaller toward the outboard region than toward the inboard region. The apices 130*a*, 140*a* of the two side cushions 130, 140, along with the sloped rear surface of the center cushion 120, may form a rearward occupant-receiving surface of the airbag cushion 110 to receive an occupant during a collision event. The configuration of the side cushions 130, 140—in particular the apices 130*a*, 140*a*—may permit the side cushions 130, 140 to engage with the head of an occupant at initial impact of the occupant with the airbag cushion 110 without interacting with the torso or shoulders of the occupant, particularly in an oblique collision event. Engagement of the side cushions 130, 140 with the head but not with the torso or shoulders may prevent the airbag cushion 110 itself from inducing rotation of the head relative to the torso and shoulders while simultaneously limiting, reducing or preventing rotation of the head relative to the vehicle from other forces during ridedown. In some embodiments, the side cushions 13, 140 may contact the shoulders and/or torso after initially receiving the occupant (e.g., after initial impact of the occupant with the airbag cushion 110) and during ridedown.

Each of the two side cushions 130, 140 may include at least one vent 170 (the vent of side cushion 130 is not visible in FIG. 4). The vent(s) 170 may permit inflation gases to escape at a controlled rate during ridedown. The vent(s) 170 may prevent inflation of either side cushion 130, 140 from becoming over-pressured relative to the opposite side cushion 130, 140 during a collision event and, more particularly, during ridedown. For example, in a driver-side oblique impact collision, the head of the occupant may first be received by the inboard side cushion 130. Deformation of the inboard side cushion 130 as a result of receiving the head of the occupant may cause the inflation gas pressure within the inboard side cushion 130 to exceed the pressure within the outboard side cushion. Venting inflation gases from the side cushion 130, 140 at occupant impact may reduce or limit the over-pressurization of that side cushion 130, 140 to maintain a desired performance of the airbag cushion 110.

The configuration of the airbag cushion 110, including the center cushion 120 and the two side cushions 130, 140, may allow deployment and inflation with a lower volume of inflation gases than may otherwise be required to afford a similar degree of protection to an occupant using other configurations of an airbag cushion. The lower inflation gas volume requirement may permit the airbag cushion 110 to deploy and fully inflate more rapidly than may be possible with other airbag cushion configurations.

FIG. 5 is right side sectional view of the airbag cushion 110 of FIG. 4, taken through the line 5-5 of FIG. 5. The airbag cushion 110 is shown in a deployed and inflated state. In this embodiment, the airbag inflation duct 112 is contiguous with the center cushion 120. The center cushion 120 is shown with the outboard section removed (looking at the inside of the inboard section of the center cushion 120). In all pertinent respects, the outboard side cushion 140 (not shown in FIG. 5, but see FIG. 4) may be configured similarly to the inboard side cushion 130. The inboard side cushion 130 is shown in an isometric position relative to the center cushion 120. The apices 120*a*, 130*a* are also shown. The rear surface of the center cushion 120 slopes downward and rearward from the apex 120*a* of the center cushion 120. The inboard side cushion 130 extends rearward from approximately the area of the apex 120*a* above the slope of the center cushion 120. The inboard side cushion 130 is angled longitudinally (see, e.g., FIGS. 3A, 3B) such that the apex 130*a* extends in a direction to approach the apex of the outboard side cushion (not shown, but see, e.g., FIG. 4) over the slope of the rear surface of the center cushion 120 and rearward of the apex 120*a*. The rearward slope of the rear surface of the center cushion 120 may interact with the torso of an occupant to decelerate the occupant during ridedown following a collision event. The inward angulation of the inboard side cushion 130 (along with the outboard side cushion) above the downward slope of the center cushion 120 may allow the two side cushions 130, 140 to interact with the head of an occupant during and following a collision event to reduce, limit, or prevent head rotation. The side cushion 130 may couple to the center cushion 120 at an inter-cushion interface 150. The outboard side cushion 140 may likewise couple to the center cushion 120 at an inter-cushion interface 150.

In at least one embodiment, the inter-cushion interface 150 may be a distinct panel which couples to and between the center cushion 120 and either of the side cushions 130, 140, with one inter-cushion interface 150 to either side of the center cushion 120. In another embodiment, the inter-cushion interface 150 on either side of the center cushion 120 may be contiguous with the side surface of the center cushion 120. In yet another embodiment, the inter-cushion interface 150 may be contiguous with the center-cushion-facing surface of each side cushion 130, 140. In some embodiments, the inter-cushion interface 150 may exist only as a seam coupling between the center cushion 120 and each of the side cushions 130, 140.

The inter-cushion interface 150 may include a valve or aperture 160, or other means of communicating gases between the center cushion 120 and the respective side cushion 130, 140. The valve or aperture 160 may include a pressure control valve (further described below). A pressure control valve (or other valve or aperture 160) may be placed between each of the pair of side cushions 130, 140 and the center cushion 120. Each valve or aperture 160 may serve to regulate or control the pressure of inflation gases in each cushion 120, 130, 140 and to regulate or control the flow of inflation gases between the cushions 120, 130, 140.

Figure 6:
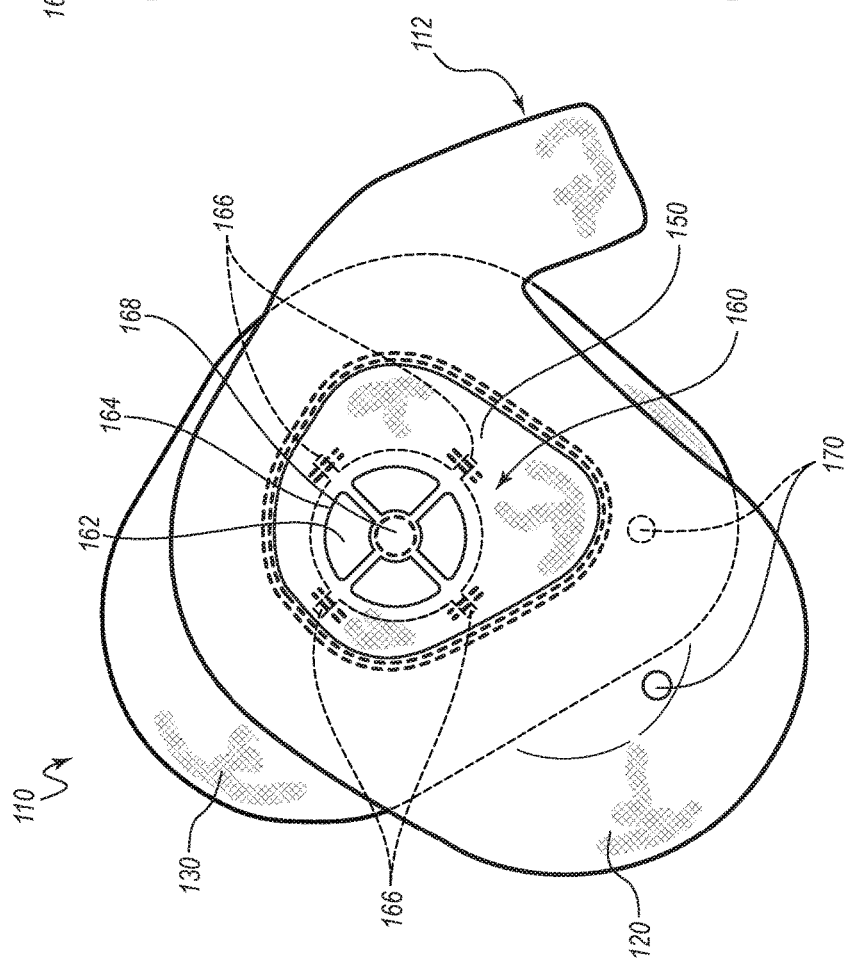
FIG. 6 is a sectional view of the airbag cushion of FIG. 5 showing an inter-cushion interface and a valve.

FIG. 6 is a sectional right side view of the airbag cushion 110 of FIG. 5 showing the inter-cushion interface 150 and valve 160. In this embodiment, the airbag inflation duct 112 is contiguous with the center cushion 120. The inboard side cushion 130 and inboard portion of the center cushion 120 are shown. The inter-cushion interface 150 couples the inboard lateral surface of the center cushion 120 to the inboard side cushion 130. The inter-cushion interface 150 may include a pressure control valve 160. In the embodiment shown, the pressure control valve 160 is a check valve 160. The check valve 160 is depicted in the inter-cushion interface 150 between the inboard lateral surface of the center cushion 120 and the inboard side cushion 130. A corresponding inter-cushion interface and check valve may be disposed between the center cushion 120 and the outboard side cushion (not shown, but see, e.g., FIG. 4). In other embodiments, different valves, apertures or methods may be used to control the flow of inflation gases between the center cushion 120 and the inboard side cushion 130 (as well as between the center cushion 120 and the outboard side cushion). The check valve 160 may include a check valve cover 162 and a check valve aperture 164.

Prior to deployment of the airbag cushion 110, and after the airbag cushion 110 is fully inflated, the check valve cover 162 may cover (or close) the check valve aperture 164. The check valve aperture 164 may include one or more orifices to communicate inflation gases from one cushion to an adjacent cushion. In this embodiment, the check valve aperture 164 may communicate inflation gases from the center cushion 120 to the inboard side cushion 130. (The corresponding check valve in the inter-cushion interface on the opposite side of the center cushion 120 may likewise communicate inflation gases from the center cushion 120 to the outboard side cushion). The check valve cover 162 may include one or more attachment tabs 166 around the perimeter of the check valve cover 162. The check valve cover 162 may be coupled at its perimeter to the inter-cushion interface 150 by seams or other suitable means at or across the attachment tabs 166 of the check valve cover 162. The check valve cover 162 may be coupled to the inter-cushion interface 150 by a seam or other method at or near the center 168 of the check valve cover 162. The partial coupling of the check valve cover 162 at its perimeter to the inter-cushion interface 150 may permit the check valve cover 162 to admit inflation gases from one side of the check valve 160 through the check valve aperture 164 into a cushion or chamber on the opposite side of the check valve 160. The partial coupling of the check valve cover 162 at its perimeter to the inter-cushion interface 150 may permit the check valve cover 162 to control, limit or regulate the volume or rate of inflation gases admitted from one cushion or chamber to the adjacent cushion or chamber. The partial coupling of the check valve cover 162 at its perimeter to the inter-cushion interface 150 may permit the check valve cover 162 to prevent, limit or control the backflow of inflation gases from one cushion or chamber into the adjacent cushion or chamber. The coupling of the check valve cover 162 at or near its center 168 may assist in allowing inflation gases to pass from one cushion or chamber to an adjacent cushion chamber, in limiting or controlling such passage, or in preventing the backflow of inflation gases from one cushion or chamber into the adjacent cushion or chamber.

The center cushion 120 may include at least one vent 170 to assist in controlling the pressure within the center cushion 120 and to control the escape of inflation gases during ridedown. The inboard side cushion 130 may include at least one vent 170 to assist in controlling the pressure within the side cushion 130 and to control the escape of inflation gases during ridedown. The outboard side cushion (not shown) may be similarly configured as the inboard side cushion 130. The vents 170, as described, may be passive or active vents. The vents 170 may be positioned at any suitable location to provide desired venting and/or control pressure within the center cushion 120 and/or the side cushion 130 by controlling the escape of inflation gases during ride down.

Figure 7A:
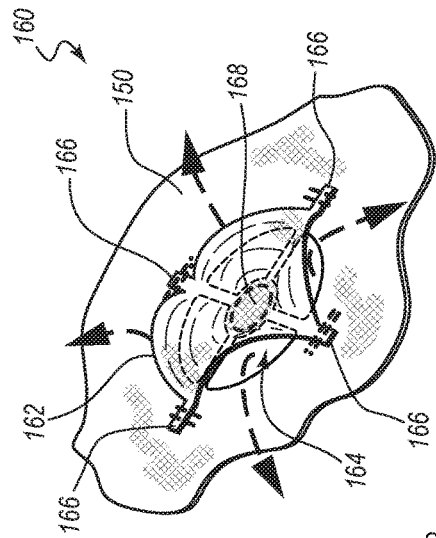
FIG. 7A is a cutaway view of the valve of FIG. 6 in operation during inflation of the airbag cushion.

FIG. 7A is a cutaway view of the check valve 160 of FIG. 6 in operation during inflation of the airbag cushion. The check valve cover 162 may be coupled to the inter-cushion interface 150 at the attachment tabs 166 and the check valve center 168. In the embodiment shown, the check valve cover 162 faces into a side cushion (e.g., side cushion 130 of FIG. 6). Inflation gases are entering the center cushion (e.g., center cushion 120 of FIG. 6) by operation of an airbag inflator. As the center cushion inflates, the pressure of the inflation gases within the center chamber may lift the check valve cover 162, and inflation gases may pass through check valve aperture 164 into the side cushion. As the inflation gases pass through the check valve aperture 164, segments of the check valve cover 162 be lifted away from the check valve aperture 164. In at least one embodiment, the check valve cover 162 is coupled to the inter-cushion interface 150 with no draw tension (further described below). In another embodiment, the check valve cover 162 may be coupled to the inter-cushion interface 150 with a specific degree of draw tension. In an embodiment where the check valve cover 162 is coupled to the inter-cushion interface 150 with no draw tension, when the pressure in the side cushion equals or approaches the pressure in the center chamber, the check valve cover 162 may cease to be lifted away from, and thereby close, the check valve aperture 164. In an embodiment where the check valve cover 162 is coupled to the inter-cushion interface 150 with a specific draw tension, the check valve cover 162 may cease to be lifted away from and close the check valve aperture 164 when a specific pressure has been achieved in the side cushion. In yet another embodiment where the check valve cover 162 is coupled to the inter-cushion interface 150 with a specific draw tension, the check valve cover 162 may cease to be lifted from and close the check valve aperture 164 when a specific difference of pressure exists between the gases in the center cushion and the side cushion. When the check valve cover 162 ceases to be lifted from and closes the check valve aperture 164, the check valve cover 162 may prevent the backflow of gases through the check valve aperture 164 from the side cushion to the center cushion. The configuration of the check valve 160 may configure the center cushion to achieve and maintain an appropriate inflation size, shape and pressure to receive, support and decelerate the torso of an occupant during ridedown. The check valve 160 configuration may also assist the side cushions to achieve and maintain an appropriate inflation size, shape and pressure to receive the head of an occupant and limit, reduce or prevent rotation of the head, and to support the head during ridedown. While FIG. 7A illustrates an embodiment wherein the inflation gases are first communicated into the center cushion and pass through the check valve(s) 160 into the side cushion(s), other embodiments may include the communication of inflation gases from the inflator(s) into one or both side cushions, and the gases then pass through the check valve(s) 160 into the center cushion. In embodiments where the check valves 160 or other pressure control valves permit inflation gases to flow from the center cushion into the side cushions, the valves 160 may restrict the flow of gases from the center cushion to the side cushions such that the center cushion achieves a higher inflation pressure than do the side cushions. Active vents may open after a certain time to allow inflation gases to escape from the center cushion, which may reduce pressure within the center cushion. In embodiments where the valves 160 permit the flow of inflation gases from the side cushions into the center cushion, the valves 160 may restrict the flow of gases from the side cushions into the center cushion such that the side cushions achieve a higher inflation pressure than does the center cushion.

Figure 7B:
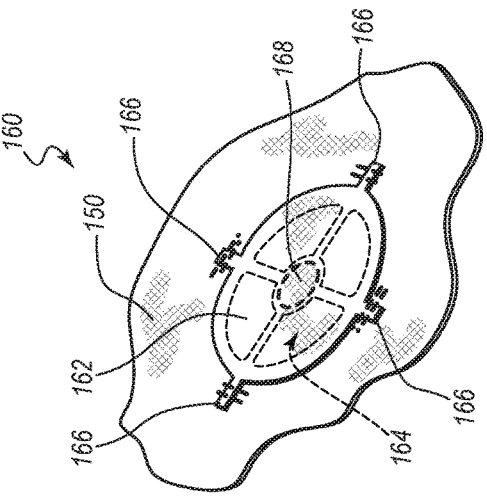
FIG. 7B is a cutaway view of the valve of FIG. 7A in operation after inflation of the airbag cushion.

FIG. 7B is a cutaway view of the check valve 160 of FIG. 7A in operation after inflation of the airbag cushion. In the embodiment shown, the check valve cover 162 is lying flat over and closing the check valve aperture 164. The check valve cover 162 is coupled to the inter-cushion interface 150. The check valve cover 162 may be coupled to the inter-cushion interface 150 at the attachment tabs 166 and at the check valve center 168. The check valve cover 162 may be coupled to the inter-cushion interface 150 by seams or by any appropriate method at or across the attachment tabs 166. The check valve cover 162 may be coupled to the inter-cushion interface 150 with no draw tension, or with a specific draw tension. The check valve cover 162 may be coupled to the inter-cushion interface 150 with no draw tension by placing the check valve cover 162 in place and coupling it to the inter-cushion interface 150 without drawing the check valve cover 162 in any direction or manner during the coupling operation. For example, the fabric of the check valve cover 162 may be placed over the check valve aperture 164 onto the inter-cushion interface 150 and coupled into place with no tension applied. In another embodiment, the check valve cover 162 may be coupled to the inter-cushion interface 150 with a specific draw tension by any method which draws, pulls or otherwise tightens the check valve cover 162 across the check valve aperture 164 and inter-cushion interface 150. For example, the fabric of the check valve cover 162 may be placed over the check valve aperture 164 and on the inter-cushion interface 150 and may be coupled first at the center 168; then, by any appropriate method, each attachment tab 166 of the check valve cover 162 may be drawn or pulled away from the center 168 before being coupled to the inter-cushion interface 150.

Figure 8:
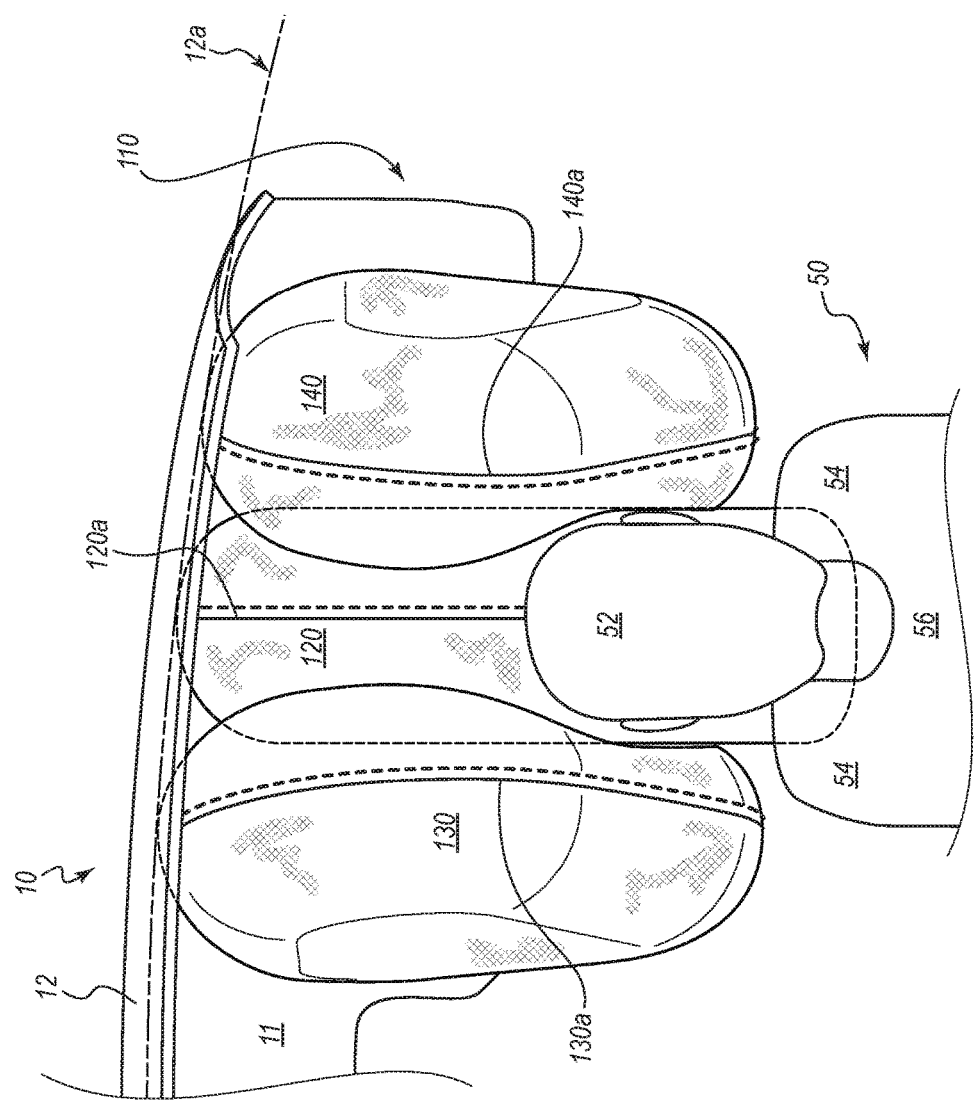
FIG. 8 is a downward-angled rear perspective view of the airbag cushion of FIG. 4, with the airbag cushion deployed and inflated.

FIG. 8 is a downward-angled rear perspective view of the airbag cushion 110 of FIG. 4, showing the airbag cushion 110 in a deployed and inflated state. (See, e.g., FIG. 2 for the angle of view 8-8 in which FIG. 8 is depicted.) The forward region of the airbag cushion 110 may include the forward aspects of the center cushion 120 and the two side cushions 130, 140. In a deployed and inflated state, the forward portion of the center cushion 120 may rest against a rear surface of the dashboard 11. In some embodiments, the forward-most region of the center cushion 120 may rest against a portion of the windscreen 12. In some embodiments in which the inflation duct (not shown, but see, e.g., 112 in FIGS. 2, 4) is contiguous with the center cushion 120, the inflation duct may rest against an aspect of the dashboard 11 and/or windscreen 12. The forward portion of the inboard side cushion 130 may rest against a rear surface of the dashboard 11. The upper surface of the inboard cushion 130 may rest against the windscreen 12. The forward portion of the outboard side cushion 140 may rest against a rear face of the dashboard 11. The upper surface of the outboard side cushion 140 may rest against the windscreen 12. In an embodiment in which all three cushions 120, 130, 140 rest against the windscreen 12, the engagement of the cushions 120, 130 140 may follow an arc of tangency 12*a* to the windscreen 12. The forward portions of all three cushions 120, 130, 140 may rest against a rear surface of the dashboard 11 despite variations in the geometry of the dashboard 11 across (forward of) the vehicle seating position. The upper surfaces of at least the two side cushions 130, 140 may rest against the windscreen 12 despite the variation of geometry of the windscreen 12 across (forward of) the vehicle seating position. In other words, the overall width of the forward aspects of the airbag cushion 110 and the specific configurations of the individual cushions 120, 130, 140 may conform to the varying geometry of the vehicle structures in front of the vehicle seating position to permit the forward aspects of the airbag cushion 110 to rest against and be supported by the dashboard 11 and windscreen 12. In some embodiments, the side cushions 130, 140 may also rest against a forward portion of the roof (see, e.g., FIGS. 1, 2). The forward aspect of the airbag cushion 110, and the upper surfaces of at least the side cushions 130, 140 resting against and being supported by the dashboard 11 and windscreen 12 (and, in some embodiments, the roof) may permit the airbag cushion 110 a greater degree of stability and support of the occupant 50 during ridedown.

The rear surface of the center cushion 120 of the airbag cushion 110 may angle downward and rearward from the apex 120*a* of the center cushion 120. The two side cushions 130, 140 may angle somewhat upward and may angle inward toward each other over the downward rear slope of the center cushion 120. The apices 130*a*, 140*a*, of the side cushions 130, 140 may extend over or nearly over the rear slope of the center cushion 120. The apices 130*a*, 140*a* of the side cushions 130, 140 may extend substantially rearward relative to the apex 120*a* of the center cushion 120. The side cushions 130, 140 may have a symmetric angle relative to the center cushion 120. The symmetric angle of the side cushions 130, 140 relative to the center cushion 120 may impart to the airbag cushion 110 a geometric shape in which the forward aspect of the airbag cushion 110 is wider than the rear aspect of the airbag cushion 110. The geometric shape of the airbag cushion 110 may provide for a wider reaction base at the forward aspect of the airbag cushion to interface or couple with the dashboard 11, the windscreen 12, the roof, or any combination of these.

The narrower aspect at the rear of the airbag cushion 110—in particular, the apices 130*a*, 140*a*, of the side cushions 130, 140—may form a rearward occupant-receiving area. The rearward occupant-receiving area may include the apices 130*a*, 140*a* of the side cushions 130, 140, and the rear sloped surface of the center cushion 120. More specifically, the apices 130*a*, 140*a* of the side cushions 130, 140 may form an occupant-receiving area to receive the head 52 of an occupant 50. In a collision event, the occupant-receiving area of the apices 130*a*, 140*a* may receive the head 52 and may limit, reduce or prevent rotation of the head 52 of the occupant 50. The rear sloped surface of the center cushion 120 may form an occupant-receiving area to receive the torso 56 of the occupant. The occupant-receiving area of the center cushion 120 may receive the torso 56 and may support and decelerate the torso 56 of the occupant during ridedown.

Figure 9:
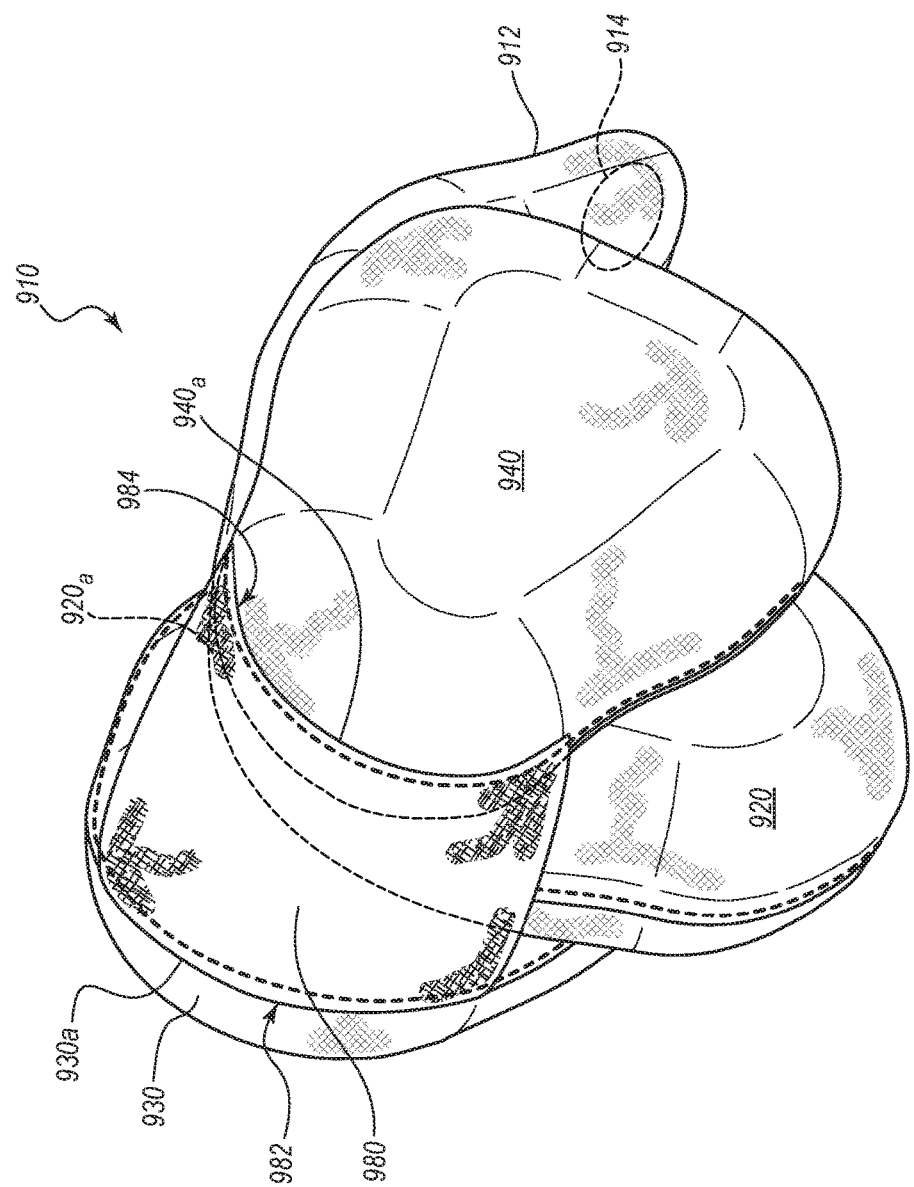
FIG. 9 is a perspective view of an airbag cushion, according to another embodiment, in a deployed and inflated state and including a sail panel.

FIG. 9 is a right perspective view of an airbag cushion 910, according to another embodiment (similar to the airbag cushion 110 of FIG. 4), in a deployed and inflated state with a sail panel 980. The airbag cushion 910 has been deployed and inflated by operation of the inflator (not shown). In this embodiment, the airbag cushion 910 may couple to the inflator (not depicted) or inflator plumbing (e.g., channels or conduits to direct the flow of inflation gases) at an inflation duct 912. The inflation duct 912 may include at least one inflation aperture 914. The inflation aperture(s) 914 may be contiguous with the inflation duct 912, in particular, at the forward end of the inflation duct 912. The inflation aperture(s) 914 may admit inflation gases from the inflator (not shown, but see, e.g., 104 in FIGS. 3A, 3B) to the inflation duct 912. The inflation duct 912 may communicate inflation gases to one or more cushions 920, 930, 940. In various embodiments, there may be one or more inflation ducts 912. The inflation duct(s) 912 may be contiguous with the center cushion 920, or with either or both of the side cushions 930, 940, or with all three cushions 920, 930, 940.

The center cushion 920 may have a generally oval or irregular tetrahedral shape in longitudinal cross-section. The center cushion 920 may have a rear surface which angles downward and rearward from the apex 920*a* of the center cushion 920. The two side cushions 930, 940 each have a generally triangular profile, the apex 930*a*, 940*a* of which is oriented rearward relative to the vehicle. The apices 930a, 940a extend substantially rearward relative to the apex 920a and sloping rear surface of the center cushion 920.

The sail panel 980 may be coupled to and extend between the pair of side cushions 930, 940. The sail panel 980 may couple to the apices 930a, 940a and may extend over and across the occupant-facing rear surface of the central cushion 920. The outboard edge 984 of the sail panel 980 may couple to the apex 940a of the outboard side cushion 940. In at least one embodiment, the outboard edge 984 of the sail panel 980 may couple to the outboard side cushion 940 along a seam otherwise disposed in the rear surface of the outboard side cushion 940. In another embodiment, the outboard edge 984 of the sail panel 980 may couple to the outboard side cushion 940 along a seam dedicated to coupling the sail panel 980 to the outboard side cushion 940. The sail panel 980 and the apices 930a, 940a may be disposed above the occupant's shoulders so as to receive the head of an occupant, particularly at initial impact of the occupant with the airbag cushion 910 during an oblique collision event.

Similarly, the inboard edge 984 of the sail panel 980 may couple to the apex 940a of the inboard side cushion 930. In at least one embodiment, the inboard edge 984 of the sail panel 980 may couple to the inboard side cushion 930 along a seam otherwise disposed in the rear surface of the inboard side cushion 930. In another embodiment, the inboard edge 984 of the sail panel 980 may couple to the inboard side cushion 930 along a seam dedicated to coupling the sail panel 980 to the inboard side cushion 930. The sail panel 980 and the apices 930a, 940a may be disposed above the occupant's shoulders so as to receive the head of an occupant, particularly at initial impact of the occupant with the airbag cushion 910 during an oblique collision event. .

The size and shape of the inboard side cushion 930 differ from the size and shape of the outboard side cushion 940. In the embodiment shown, the inboard side cushion 930 is somewhat larger and angled differently than the outboard side cushion 940. The configuration (size, shape and angle) of the inboard side cushion 930 generally conforms to the space available in a particular vehicle between the dashboard, windscreen and roof (not depicted), which is typically larger toward the inboard region than toward the outboard region. The configuration (size, shape and angle) of the outboard side cushion 940 generally conforms to the space available in a particular vehicle between the dashboard, windscreen, roof, and door (not depicted), which is typically smaller toward the outboard region than toward the inboard region.

The sail panel 980 and the apices 930a, 940a of the two side cushions 930, 940, along with the sloped rear surface of the center cushion 920, may form a rearward occupant-receiving surface of the airbag cushion 910 to receive an occupant during a collision event. The configuration of the sail panel 980 and the side cushions 930, 940—in particular, the apices 930a, 940a—may permit the sail panel 980 and the side cushions 930, 940 to receive with the head of an occupant without interacting with the torso or shoulders of the occupant, particularly at initial impact of the occupant with the airbag cushion 910 during an oblique collision event. The sail panel 980 and the side cushions 930, 940 receiving the head, and not the torso or shoulders, may prevent the airbag cushion 910 itself from inducing rotation of the head while simultaneously limiting, reducing or preventing rotation of the head from other forces during ridedown.

Figure 10:
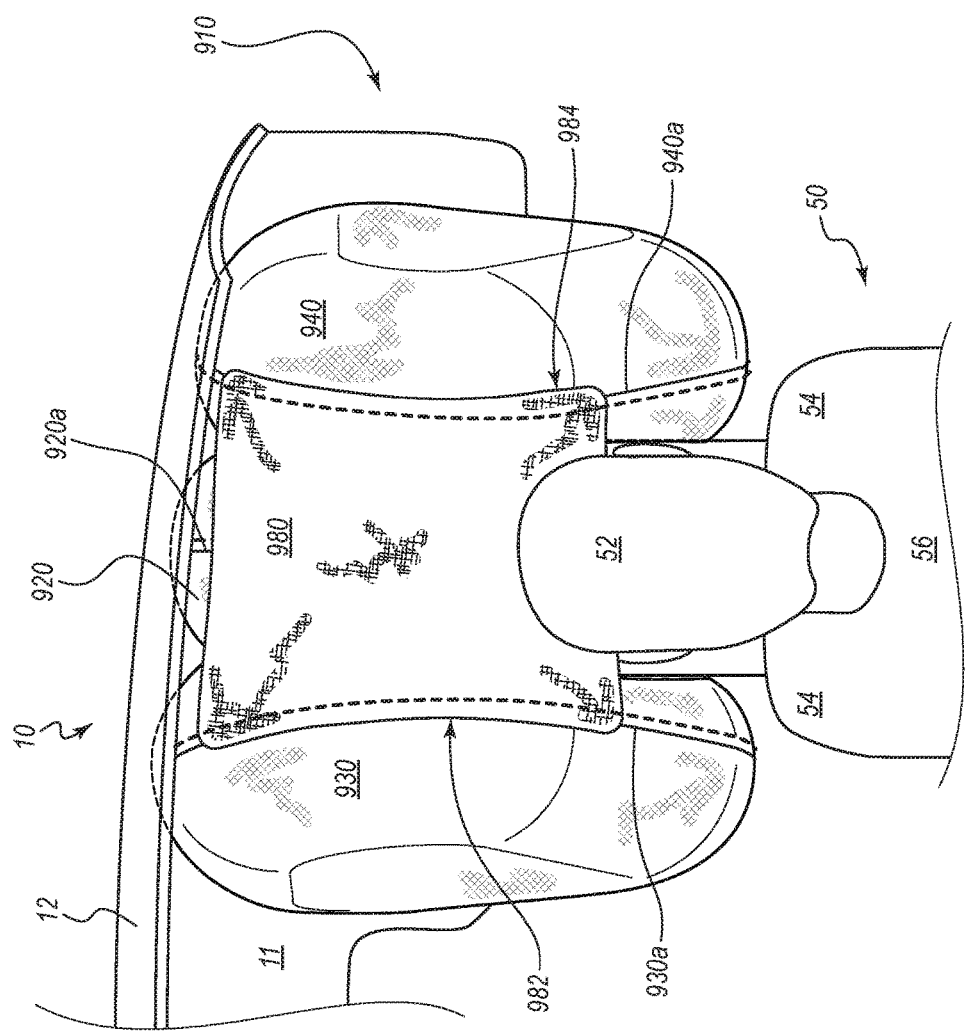
FIG. 10 is a downward-angled rear perspective view of the airbag cushion of FIG. 9, with the airbag cushion deployed and inflated, and including a sail panel.

FIG. 10 is a downward-angled rear perspective view of the airbag cushion 910 of FIG. 9, showing the airbag cushion 910 deployed and inflated, with the sail panel 980. (See, e.g., FIG. 2 for the angle of view 8-8 in which FIG. 10 is depicted.) The rear surface of the center cushion 920 of the airbag cushion 910 may angle downward and rearward from the apex 920a of the center cushion 920. The two side cushions 930, 940 may angle somewhat upward and may angle inward toward each other over the downward rear slope of the center cushion 920. The apices 930a, 940a, of the side cushions 930, 940 may extend over or nearly over the rear slope of the center cushion 920. The apices 930a, 940a of the side cushions 930, 940 may extend substantially rearward relative to the apex 920a of the center cushion 920. The sail panel 980 may be coupled to the side cushions 930, 940 at or near or along the apices 930a, 940a. The inboard edge 982 of the sail panel 980 may be coupled to the inboard side cushion 930 along an approximately vertical seam (relative to the vehicle 10) crossing at or near the apex 930a of the inboard side cushion 930. The outboard edge 984 of the sail panel 980 may be coupled to the outboard side cushion 940 along an approximately vertical seam (relative to the vehicle 10) crossing or near the apex 940a of the outboard side cushion 940. The sail panel 980 may be disposed rearward of and above the rear downward slope of the center cushion 920. The side cushions 930, 940 may have a symmetric angle relative to the center cushion 920 (see, e.g., FIG. 3A). The symmetric angle of the side cushions 930, 940 relative to the center cushion 920 may impart to the airbag cushion 910 a geometric shape in which the forward aspect of the airbag cushion 910 is wider than the rear aspect of the airbag cushion 910.

The geometric shape of the airbag cushion 910 may provide for a wider reaction base at the forward aspect of the airbag cushion 910 to interface or couple with the dashboard 11, the windscreen 12, or the roof (not shown), or any combination of these. The narrower aspect at the rear of the airbag cushion 910—in particular, the apices 930a, 940a of the side cushions 930, 940—with the sail panel 980 may form a rearward occupant-receiving area. The rearward occupant-receiving area may include the sail panel 980, the apices 930a, 940a of the side cushions 930, 940, and the rear sloped surface of the center cushion 920. More specifically, the sail panel 980 and the apices 930a, 940a of the side cushions 930, 940 may form an occupant-receiving area to receive the head 52 of an occupant 50. In a collision event, the occupant-receiving area of the sail panel 980 and the apices 930a, 940a may receive the head 52 and may limit, reduce or prevent rotation of the head 52 of the occupant 50. The rear sloped surface of the center cushion 920 may form an occupant-receiving area to receive the torso 56 of the occupant. The occupant-receiving area of the center cushion 920 may receive the torso 56 and may support and decelerate the torso 56 of the occupant during ridedown.

Figure 11:
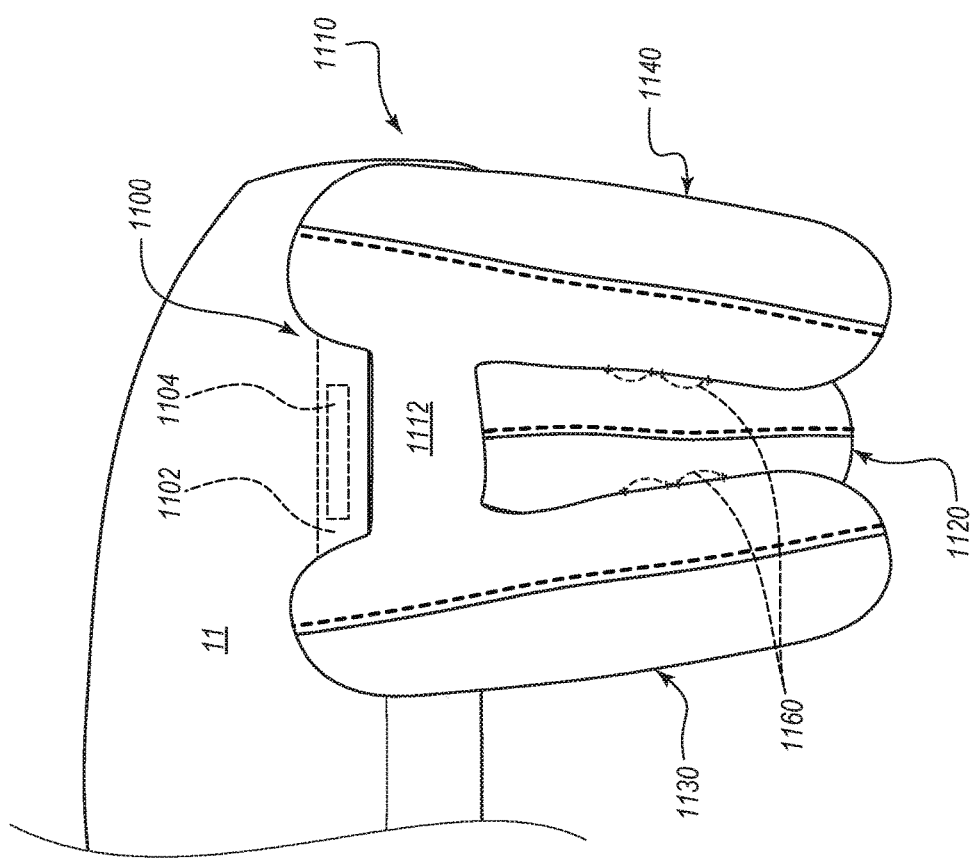
FIG. 11 is a top view of an inflatable airbag system according to another embodiment.

FIG. 11 is a top view of an airbag assembly 1100, according to one embodiment, including an airbag cushion 1110 that is similar to the airbag cushion 110 of FIG. 3A, a housing 1102, and an inflator 1104. The airbag cushion 1110 is in a deployed and inflated state. The airbag cushion 1110 includes an alternative configuration of the inflation duct(s) 1112. In the embodiment shown in FIG. 11, the inflation duct 1112 may couple at the forward end of the inflation duct 1112 to the inflator 1104. The inflation duct 1112 may couple to the two side cushions 1130, 1140. The inflation duct 1112 may communicate inflation gases from the inflator 1104 to both side cushions 1130, 1140. In such an embodiment, the pressure control valves 1160 may be reversed such that the direction of inflation gas flow is from the respective side cushion 1130, 1140 into the center cushion 1120.

In yet other embodiments, the inflation duct 1112 may couple to all three cushions 1120, 1130, 1140 and may communicate inflation gases into all three cushions 1120, 1130, 1140 simultaneously. In some embodiments, the inflation duct 1112 may include one or more inflation apertures (not shown, but see, e.g., 114 in FIG. 4) at the forward end of the inflation duct 1112. In some embodiments, the inflation duct 1112 may include one or more apertures (not shown) at or near the coupling of the inflation duct 1112 to each cushion 1120, 1130, 1140. In an embodiment in which the inflation duct 1112 couples to all three cushions 1120, 1130, 1140, the size or number of the specific apertures conducting inflation gases from the inflation duct 1112 to each cushion 1120, 1130, 1140 may differ for each cushion 1120, 1130, 1140. For example, the aperture communicating inflation gases from the inflation duct 1112 to the center cushion 1120 may be smaller than the apertures providing inflation gases to each of the two side cushions 1130, 1140. The smaller inflation duct 1112 aperture servicing the center cushion 1120 may permit inflation of the center cushion 1120 to a somewhat lower pressure than the inflation pressure of the two side cushions 1130, 1140.

In another embodiment in which the inflation duct 1112 communicates inflation gases from the inflator 1104 to all three cushions 1120, 1130, 1140 simultaneously, the apertures to service each cushion 1120, 1130, 1140 may include more than one opening between the inflation duct 1112 and the specific cushion 1120, 1130, 1140. In an embodiment in which each inflation duct 1112 aperture may include more than one opening to communicate inflation gases to each cushion 1120, 1130, 1140, each opening may be of varying sizes, or each opening may be of the same size.

In an embodiment including multiple inflation duct apertures to communicate inflation gases to each cushion 1120, 1130, 1140, the specific sizes of the various openings in each aperture may serve to control or regulate the rate of delivery of inflation gases to each cushion 1120, 1130, 1140. For example, the aperture communicating inflation gases from the inflation duct 1112 to the center cushion 1120 may include a smaller opening than the apertures communicating inflation gases into the two side cushions 1130, 1140. The smaller opening in the aperture to communicate inflation gases into the center cushion 1120 may produce a lower inflation pressure in the center cushion 1120 than in the two side cushions 1130, 1140.

In some embodiments, control of the rate of inflation gas delivery to each cushion 1120, 1130, 1140 may be achieved by varying the number of openings in each aperture from the inflation duct 1112 to each cushion 1120, 1130, 1140. For example, the aperture communicating inflation gases to the center cushion 1120 may include fewer openings than do the apertures communicating inflation gases to the two side cushions 1130, 1140, and may thereby produce a lower inflated pressure for the center cushion 1120 than for the two side cushions 1130, 1140.

In some embodiments, control of the rate of inflation gas delivery to each cushion 1120, 1130, 1140 may be achieved by varying both the number and sizes of the openings in each aperture from the inflation duct 1112 to each cushion 1120, 1130, 1140. Controlling the rate of delivery of inflation gases to each cushion 1120, 1130, 1140 may allow inflation of each cushion to a specific pressure. For example, communicating inflation gases to the center cushion 1120 at a lower rate may produce a somewhat lower inflated pressure for the center cushion 1120.

In some embodiments, control of the rate of inflation gas delivery to each cushion 1120, 1130, 1140 combined with active vents (not shown, but see, e.g., 170 in FIGS. 4, 5, 6) may permit timing control of maximum inflation of each cushion 1120, 1130, 1140. For example, in at least one embodiment, control of the rate of inflation gas delivery to each cushion 1120, 1130, 1140 may produce a lower pressure in the center cushion 1120 at the moment that the two side cushions 1130, 1140 each achieve a higher target inflation pressure, at which time active vents included in the side cushions 1130, 1140 may open to permit inflation gases to begin escaping from the side cushions 1130, 1140 while the inflator 1104 is still delivering inflation gases. Continuing to deliver inflation gases into the airbag cushion 1110 while permitting the escape of inflation gases from the side cushions 1130, 1140 may permit tuned timing control of specific pressures in each cushion 1120, 1130 1140 to facilitate receiving the head of an occupant on the side cushions 1130, 1140 and the torso of the occupant on the center cushion 1120. In other words, a configuration of the airbag cushion 1110 which permits the side cushions 1130, 1140 to begin deflating as the head of an occupant engages the side cushions 1130, 1140 while maintaining (or, in some embodiments, continuing to increase) the inflation pressure of the center cushion 1120 until the torso of the occupant engages the center cushion 1120 may better accommodate ridedown following a collision while affording protection of the head by limiting, reducing or preventing head rotation.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112, ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:
1. An inflatable airbag system that is configured to be mounted at a frontal region of a vehicle, the inflatable airbag system comprising:
   a housing configured to be mounted in a dashboard of a vehicle;

an inflator assembly at least partially disposed within the housing;
an airbag comprising:
a center cushion; and
a pair of side cushions each coupled to the center cushion on opposing sides of the center cushion, each side cushion of the pair of side cushions including a rearward apex extending rearward further than at least a portion of an occupant-facing surface of the center cushion, and oriented with respect to each other at opposite angles relative to the center cushion such that an overall geometrical shape of the airbag is wider at a forward reaction base area of the airbag than at a rearward occupant-receiving area.

2. The inflatable airbag system of claim 1, further comprising a pressure control valve between each of the pair of side cushions and the center cushion.

3. The inflatable airbag system of claim 2, wherein the pressure control valve controls gas flow to tune a pressure within each of the pair of side cushions to be higher than a pressure within the center cushion, such that the center cushion is softer than the pair of side cushions.

4. The inflatable airbag system of claim 2, wherein the pressure control valve provides a check valve function.

5. The inflatable airbag system of claim 4, wherein the check valve function provides triple chamber pressure timing control.

6. The inflatable airbag system of claim 1, wherein the pair of side cushions are to receive inflation gas to inflate to a higher pressurization than the center cushion.

7. The inflatable airbag system of claim 1, wherein the forward reaction base area is to be positioned against one or more of the dashboard and a windscreen of the vehicle, and wherein the rearward occupant-receiving area is to receive an occupant during a collision event.

8. The inflatable airbag system of claim 1, further comprising a sail panel coupled to and extending between the pair of side cushions at their apices to extend across and rearward of a portion of an occupant-facing surface of the center cushion.

9. The inflatable airbag system of claim 1, wherein the apex of each of the pair of side cushions is positioned to avoid contact of occupant shoulders with the pair of side cushions at initial impact of the occupant with the airbag during an oblique collision event.

10. The inflatable airbag system of claim 1, wherein the apex of an outboard side cushion of the pair of side cushions extends rearward to a differing extent than an inboard side cushion of the pair of side cushions.

11. An inflatable airbag system that is configured to be mounted at a frontal region of a vehicle, the inflatable airbag system comprising:
a housing configured to be mounted in a dashboard of a vehicle;
an inflator assembly at least partially disposed within the housing; and
an airbag comprising:
a center cushion; and
a pair of side cushions each coupled to the center cushion on opposing sides of the center cushion adjacent an upper half of the center cushion, and oriented at opposite angles relative to the center cushion such that an overall geometrical shape of the airbag is wider at a forward reaction base area of the airbag than at a rearward occupant-receiving area.

12. The inflatable airbag system of claim 11, further comprising a pressure control valve between each of the pair of side cushions and the center cushion.

13. The inflatable airbag system of claim 12, wherein the pressure control valve controls gas flow to tune a pressure within each of the pair of side cushions to be higher than a pressure within the center cushion, such that the center cushion is softer than the pair of side cushions.

14. The inflatable airbag system of claim 11, wherein the forward reaction base area is to be positioned against one or more of an instrument panel and a windscreen of the vehicle, and wherein the rearward occupant-receiving area is to receive an occupant during a collision event.

15. The inflatable airbag system of claim 11, further comprising a sail panel coupled to and extending between the pair of side cushions at the apex to extend across and rearward of a portion of an occupant-facing surface of the center cushion.

16. The inflatable airbag system of claim 11, wherein the apex of each of the pair of side cushions is positioned to be disposed above shoulders of an occupant and avoid contact of the shoulders with the pair of side cushions at initial impact of the occupant with the airbag during an oblique collision event.

17. The inflatable airbag system of claim 11, wherein the apex of an outboard side cushion of the pair of side cushions extends rearward to a differing extent than an inboard side cushion of the pair of side cushions.

18. An inflatable airbag comprising:
a center lobe to be positioned forward of a vehicle seating position, the center lobe having a longitudinal axis extending from a forward surface to a rearward surface;
an inboard side lobe coupled to the center lobe, the inboard side lobe to be positioned inboard of the center lobe, the inboard side lobe oriented at an angle transverse to the longitudinal axis of the center lobe, the inboard side lobe having a triangular shape with an apex of the triangular shape extending rearward beyond at least an upper portion of the rearward surface of the center lobe, the apex to be positioned at an inboard side of a head of an occupant and above an inboard shoulder of the occupant; and
an outboard side lobe coupled to the center lobe, the outboard side lobe to be positioned outboard of the center lobe, the outboard side lobe oriented at an angle transverse to the longitudinal axis of the center lobe, the outboard side lobe having a triangular shape with an apex of the triangular shape extending rearward beyond at least an upper portion of the rearward surface of the center lobe, the apex to be positioned at an outboard side of the head of the occupant and above an outboard shoulder of the occupant,
wherein a forward portion of the airbag, including a forward portion of the center lobe and a base portion of the inboard and outboard side lobes, provides a reaction base portion that is wider than a rearward occupant-receiving portion, including the rearward surface of the center lobe and the apices of the inboard and outboard side lobes.

19. The inflatable airbag of claim 18, wherein the apex of the inboard side lobe and the apex of the outboard side lobe both are positioned to be disposed above shoulders of the occupant and to avoid contact by the shoulders at initial impact of the occupant with the inflatable airbag during an oblique collision event.

20. The inflatable airbag of claim 18, further comprising a sail panel coupled to and extending between the apex of the inboard side lobe and the apex of the outboard side lobe to extend across and rearward of a portion of an occupant-facing surface of the center lobe.

21. An inflatable airbag to receive inflation gas to inflate and expand from a packaged state within a housing to an inflated deployed state to provide occupant crash protection during a collision event, the inflatable airbag comprising:
a center lobe to be positioned forward of a vehicle seating position and defining a center inflatable chamber to receive the inflation gas to expand from the packaged state to the inflated deployed state, the center lobe in the inflated deployed state having a longitudinal axis extending from a forward base surface to a rearward occupant-facing surface;
an inboard side lobe coupled to an inboard side of the center lobe to be positioned inboard of the center lobe in the inflated deployed state, the inboard side lobe defining an inboard inflatable chamber to receive the inflation gas to expand from the packaged state to the inflated deployed state, the inboard side lobe oriented at an angle transverse to the longitudinal axis of the center lobe and extending rearward beyond the rearward occupant-facing surface of the center lobe; and
an outboard side lobe coupled to an outboard side of the center lobe to be positioned outboard of the center lobe in the inflated deployed state, the outboard side lobe defining an outboard inflatable chamber to receive the inflation gas to expand from the packaged state to the deployed state, the outboard side lobe oriented at an angle transverse to the longitudinal axis of the center lobe and extending rearward beyond the rearward occupant-facing surface of the center lobe,
wherein a forward portion of the inflatable airbag forms a forward reaction base area that extends laterally inboard-outboard wider than a rearward portion of the inflatable airbag.

22. The inflatable airbag of claim 21, wherein the inboard side lobe and the outboard side lobe include an apex extending rearward beyond at least an upper portion of the rearward surface of the center lobe, wherein at initial impact of the occupant with the inflatable airbag during a collision event the apex is to be positioned at a side of a head of an occupant and above a shoulder of the occupant.

23. The inflatable airbag of claim 22, further comprising a sail panel coupled to and extending between the apex of the inboard side lobe and the apex of the outboard side lobe to extend across and rearward of a portion of an occupant-facing surface of the center lobe.

24. The inflatable airbag system of claim 21, wherein the forward reaction base area is to be positioned against one or more of an instrument panel and a windscreen of the vehicle, and wherein the rearward occupant-receiving area is to receive an occupant during a collision event.

25. The inflatable airbag system of claim 21, wherein the apex of the outboard side lobe extends rearward to a differing extent than the apex of the inboard side lobe.

* * * * *